Nov. 8, 1960
D. L. MAPSON
2,959,291
HOOK SUPPORTED PANEL
Filed Jan. 20, 1958
2 Sheets-Sheet 1
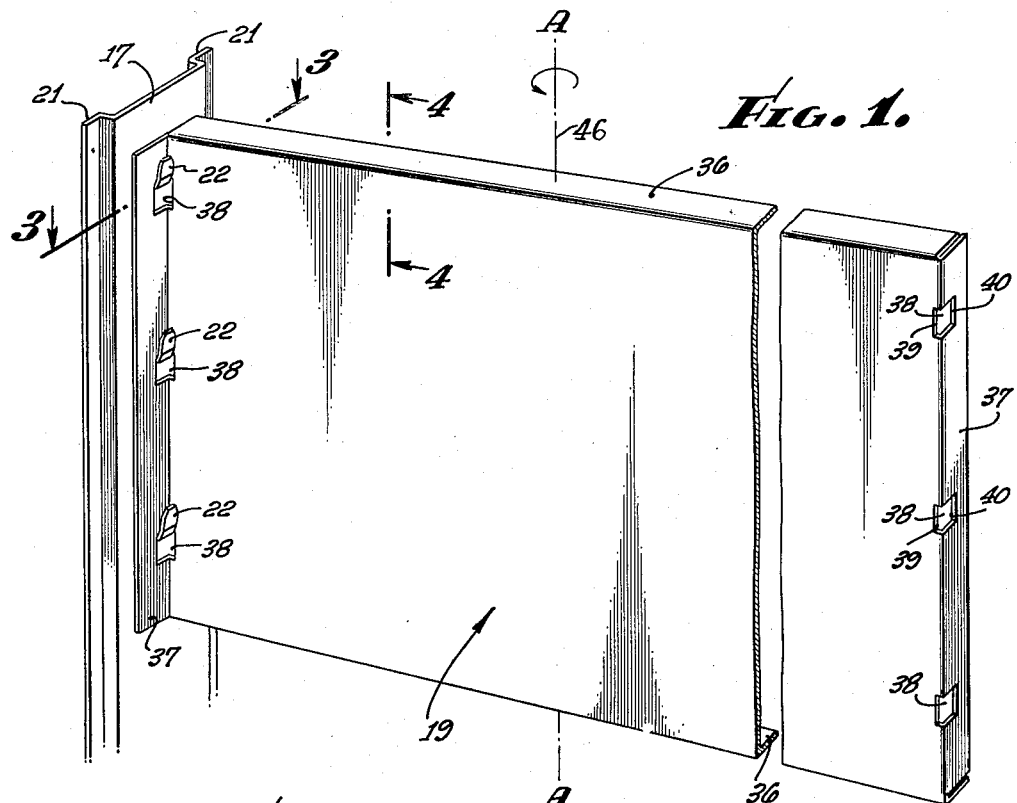
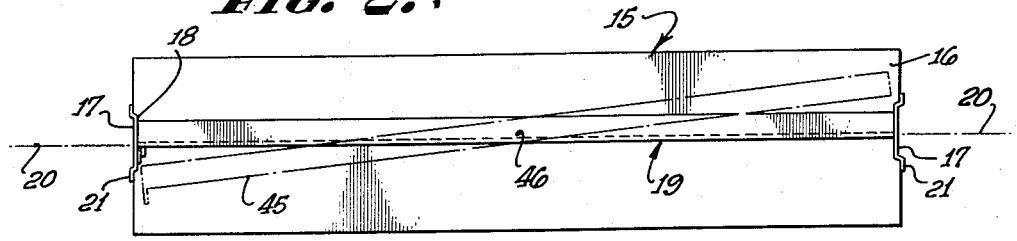
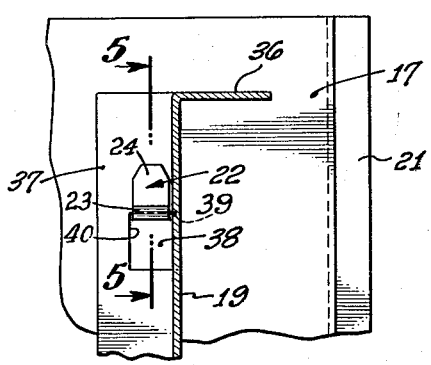
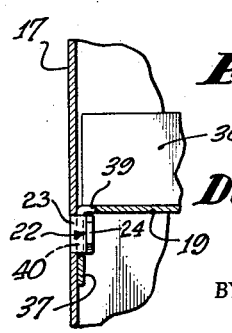
DONALD L. MAPSON,
INVENTOR.
BY
ATTORNEY.

Nov. 8, 1960 D. L. MAPSON 2,959,291
HOOK SUPPORTED PANEL
Filed Jan. 20, 1958 2 Sheets-Sheet 2
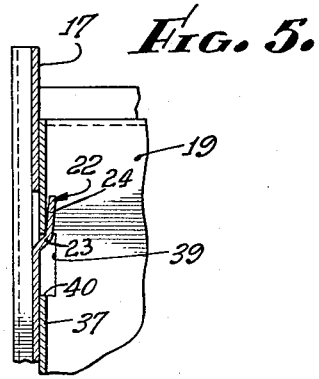
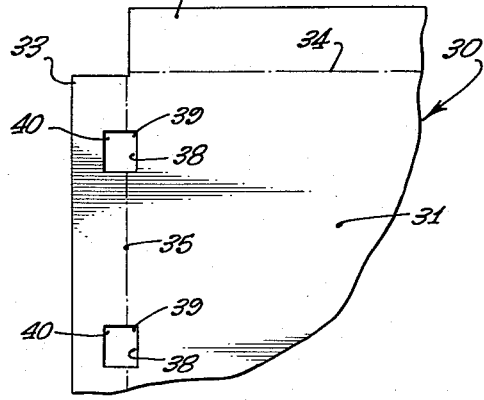
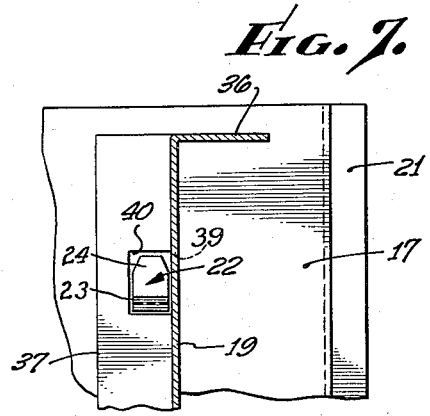
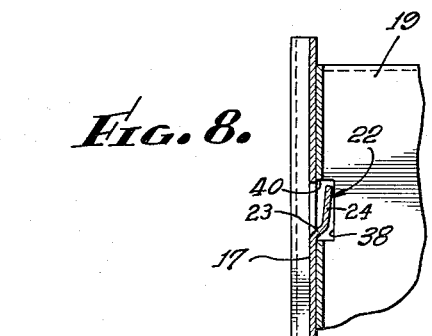
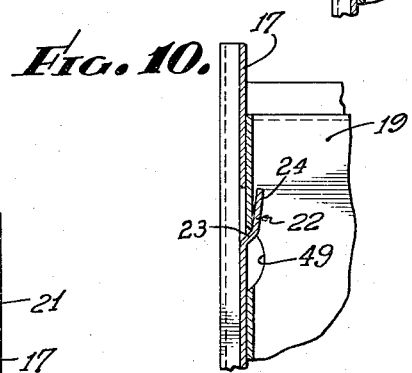
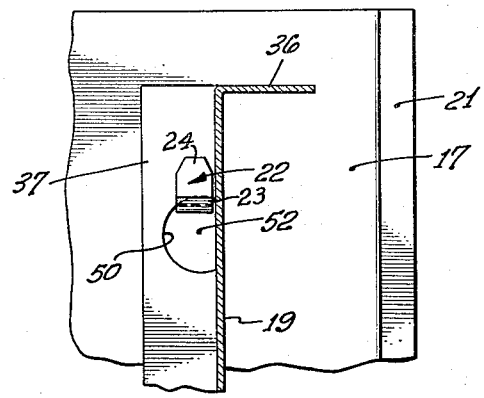
DONALD L. MAPSON,
INVENTOR.
BY
ATTORNEY.

United States Patent Office 2,959,291
Patented Nov. 8, 1960

2,959,291

HOOK SUPPORTED PANEL

Donald L. Mapson, La Habra Heights, Calif., assignor to M & D Store Fixtures, Inc., Industry, Calif., a corporation of California Filed Jan. 20, 1958, Ser. No. 710,089

5 Claims. (Cl. 211—1)

This invention relates to store fixtures and particularly to panelled merchandise displays in which display panels are mounted between rigidly spaced vertical parallel walls.

In some cases these walls are permanently incorporated with the store building. In others, they comprise posts which are part of the frame structure of a movable gondola providing display shelving.

It is an object of the present invention to provide in a display structure having a panel a suspension means for suspending said panel in an opening in said structure which means is embodied in the structure itself and does not require separate fastenings or fittings to accomplish said suspension and which will permit such panel to be readily removed from or replaced in its proper assembled relation with the balance of said structure, merely by manipulation of said panel.

Another object of the invention is to provide such a fastening means in such a structure in which the latter includes a pair of vertical posts spaced apart on opposite sides of an opening in which said panel is to be mounted, and in which the posts are identical but nonsymmetrical in construction, and in which the panel, when mounted on the structure, is symmetrically related with said posts.

Still another object of the invention is to provide such a suspension means in such a display structure in which the panel snugly fits between two vertical posts in the structure forming opposite side edges of said opening but is allowed a slight degree of vertical movement between said posts.

The manner of accomplishing the foregoing objects as well as further objects and advantages will be made manifest in the following description taken in connection with the accompanying drawings in which:

Fig. 1 is a diagrammatic perspective view of a preferred embodiment of the invention in which one of the posts of the display structure is left out of the view to illustrate the characteristics of the holes formed in the panel and flanges provided thereon.

Fig. 2 is a diagrammatic plan view on a reduced scale of the display structure shown in Fig. 1 and illustrates the manner in which the panel is manipulated in order to introduce the same into assembled relation with the posts of said structure or to remove the same from such assembled relation.

Fig. 3 is an enlarged fragmentary sectional detailed view taken on the line 3—3 of Fig. 1.

Fig. 4 is an enlarged fragmentary sectional detailed view taken on the line 4—4 of Fig. 1.

Fig. 5 is a fragmentary sectional detailed view taken on the line 5—5 of Fig. 4.

Fig. 6 is a fragmentary view at a reduced scale of a portion of a sheet metal blank employed in the method of the invention for making the panel thereof.

Fig. 7 is a view similar to Fig. 4 with the panel lifted in relation to the hooks of the posts of said display structure as when introducing said panel into assembled relation with said posts or removing the same therefrom.

Fig. 8 is a view similar to Fig. 5 illustrating the panel of the invention in lifted position as shown in Fig. 7.

Fig. 9 is a view similar to Fig. 4 and illustrating a modified form of the invention in which the hole formed on the blank of sheet metal in manufacturing the panel of the invention is a round hole.

Fig. 10 is a view similar to Fig. 5 and showing the shape of the portion of said hole which lies in the panel of the invention.

Referring specifically to the drawings, a preferred embodiment of the invention is illustrated therein as comprising a moveable gondola 15 used for displaying merchandise and which embraces in its frame structure a base 16 and two posts 17 which are formed of sheet metal and are rigidly united at their lower ends on the base 16 so as to extend upwardly therefrom in parallel relation to form, in substance, a pair of narrow, parallel walls. The structure of the gondola 15 also includes a top plate (not shown) which unites upper ends of the posts 17 so that these posts throughout their length are held in rigid spaced parallel relation thus providing an opening 18 lying in a vertical plane for receiving a panel 19 between said posts with said panel lying in a vertical plane 20 which is symmetrical with posts 17.

The posts 17 are strengthened along their opposite edges by double bends 21 formed symmetrically therein and each post has an asymmetrical vertical row of hooks 22 outstruck inwardly therefrom which hooks lie on one side of and close to the plane 20. Thus, when the posts 17 are assembled in the structure 15, the line of hooks 22 on one post 17 lies on one side of plane 20 and the line of hooks 22 of the other post 17 lies on the other side of plane 20. The hooks 22 have inwardly extending base portions 23 and tapered upwardly extending portions 24 but are otherwise substantially rectangular in shape.

The panel 19 is rectangular and of such a length that it fits snugly into the opening 18 between the posts 17 although it has a degree of freedom for vertical movement when disposed between said posts in p'ane 20. The panel 19 is preferably formed by the method of the invention which is disclosed in Fig. 6. Here we see a blank 30 is first provided which includes a rectangular middle section 31 forming the panel 19 with horizontal marginal sections 32 on the upper and lower edges of said blank and vertical marginal sections 33 on opposite side edges of the blank. Blank marginal sections are adapted to be bent from midd'e blank section 31 along broken lines 34 and 35 respectively to form horizontal and vertical panel edge flanges 36 and 37. Prior to the bending of sections 32 and 33 of blank 30 from the section 31 thereof, holes 38 are punched from blank 30 which overlie lines 35 so that a small portion 39 of each hole 38 lies in panel section 31 of said blank and a major portion 40 of each hole 38 lies in one of the sections 33 of said blank. As clearly shown in Fig. 1 the flanges 37 at opposite ends of panel 19 are bent in opposite directions from the middle section 31 of the blank 30.

The manner of assembling panel 19 in the structure 15 is as follows. Inasmuch as the panel fits snugly endwise between the posts 17 in opening 18 and the panel must be manipulated so as to bring the hooks 22 into the hole portions 40 of panel 19 to assemble the panel in the structure 15 with the panel lying in vertical plane 20, it is necessary initially to position the panel 19 as indicated by broken lines 45 in Fig. 2. In this position, the panel is supported at the level shown in Figs. 7 and 8 in which holes 38 are on the same level as hooks 22. From this position, the panel 19 is swung clockwise about its central vertical axis 46 which causes the hooks 22 to enter hole portions 40 through hole portions 39. The hole portions 39 are made of sufficient size to admit the hooks 22 through panel 19, as shown in Figs. 3 and 8, when the panel 19 is thus swung about vertical axis 46 into its full line position as shown in Fig. 2. Furthermore the hole portions 40 are made of such a shape and size as to just closely receive the hooks 22 past the adjacent face of the panel 19 so as to lie close to said face and be confined in that position by the hole portions 40 as clearly shown in Fig. 7.

To complete the assembly of the panel 19 in the structure 15 the panel is now simply lowered so that the upper edges of hole portions 40 descend behind hook portions 23 and come to rest on hook portions 23 thus hanging the panel 19 on hooks 22, as clearly shown in Figs. 1, 3, 4 and 5.

To remove the panel 19 from its assembled relation with the structure 15 the process of assembling the same therewith is merely reversed. The panel is first lifted to bring the lower edges of the hole portions 40 into engagement with the bottom portions 23 of the hooks 22 and the panel is then rotated from the full line position in which this is shown in Fig. 2 to the broken line position in which the panel is there shown. The panel may then, of course, be readily lifted out of the structure 15.

The facility with which the panels 19 in the structure 15 may be replaced is a substantial advantage inasmuch as some uses of the gondolas including such a structure require that the panels 19 be smooth and imperforate in character whereas other uses of this equipment require that panels 19 be covered with small perforations to accommodate fittings on which merchandise is hung for display purposes. A replacement of one of these kinds of panels with the other kind is thus necessary to adapt the gondola structure 15 for either of these two uses. The present invention provides a means whereby this substitution may be quickly made by the owner of the equipment himself merely by the process above described in which the replacement is effected by manipulation of the panel 19 itself and without requiring any special equipment or fasteners or fittings.

While the holes 38 punched in the blanks 30 and forming panels 19 are preferably rectangular in shape as this type of hole more readily adapts itself to the functions of the portions 39 and 40 of said holes, an economy in the construction of the dies for punching these holes may be realized by making these holes round as illustrated in Figs. 9 and 10. In this modification of the invention the panel hole portion 49 and the flange hole portion 50 comprise portions of a round hole 52 but otherwise function in identically the same manner as the portion 39 and 40 of the rectangular hole 38 above described. For purposes of definition, hole portions 39 and 49 may be referred to as "apertures" and hole portions 40 and 50 may be referred to as "openings."

The claims are:

1. In combination: a pair of walls united in fixed parallel spaced relation; a pair of hooks having portions extending short distances inwardly respectively from the inner opposed faces of said walls and other portions extending upwardly from said inwardly extending portions; a vertical panel having vertical end edges and fitting the space between said walls; and right angle flanges provided on said end edges so that said flanges are substantially in flush contact with said walls when said panel is assembled thereon, holes being provided in said panel and said flanges which holes overlap the lines of juncture between said panel and said flanges to provide apertures in said panel for receiving said hooks when said panel side edges are respectively shifted horizontally approximately parallel with said walls towards said hooks, with said flanges in trailing relation with said panel side edges during said movement, said holes also providing openings in said flanges on the same level as said apertures and adequate in size for admitting said hooks thereinto far enough for said hooks to pass entirely through said apertures, whereby, when this is accomplished, said panel may be shifted downwardly bringing upper edges of said flange openings to rest on said inwardly extending portions of said hooks, and suspending said panel on said hooks.

2. A combination as in claim 1 in which a vertical series of said hooks are provided to extend inwardly and then upwardly from each of said inner wall faces, and a corresponding series of said holes are provided in said panel and each of its vertical end flanges for simultaneously receiving said hooks in the manner aforesaid.

3. A combination as in claim 1 in which said walls are of sheet metal with said hooks in inwardly outstruck relation therewith and in which said panel is of sheet metal and said flanges are provided on said panel by bending said sheet metal at said lines of juncture.

4. A combination as in claim 1 in which the hook on one of said walls is located on the opposite side of the panel, when the latter is suspended on said hooks, from the hook on the other of said walls, and in which said flanges extend in opposite directions from opposite end edges of the panel, whereby the panel is rotated about a central vertical axis in shifting said panel end edges into and out of assembled relation with said hooks.

5. In combination: a pair of vertical walls united in fixed parallel spaced relation for the purpose of supporting a panel with the latter disposed in a given vertical plane perpendicular to said walls; two vertical series of hooks provided respectively on inner faces of said walls, each of said hooks having an inwardly extending base portion and a portion extending upwardly from said base portion, the series of hooks on one wall being disposed on one side of said plane and close thereto, the other series of hooks being on the opposite side of said plane and close thereto; a vertical panel having vertical end edges and fitting the space between said walls; and right angle flanges provided on said end edges so that said flanges are substantially in flush contact with said walls when said panel is assembled in said plane between said walls, said flanges extending in opposite directions from said end edges and in the same directions respectively that said hooks lie from said panel end edges when said panel is so assembled, two series of holes being provided in said panel and said flanges which overlap the lines of juncture between said panel and said flanges to provide apertures in said panel for simultaneously receiving all of said hooks when said panel is rotated about its central vertical axis with the latter lying in said plane, said holes also providing openings in said flanges on the same respective levels as said apertures and adequate in size for admitting said hooks thereinto far enough for said hooks to pass entirely through said apertures, whereby, when this is accomplished, said panel will lie in said plane, and may then be shifted downwardly bringing upper edges of said flange openings to rest on said inwardly extending portions of said hooks, and suspending said panel on said hooks.

References Cited in the file of this patent

UNITED STATES PATENTS

| | | |
|---|---|---|
| 1,217,973 | Mann | Mar. 6, 1917 |
| 1,688,003 | Darby | Oct. 16, 1928 |
| 1,900,004 | Whitworth | Mar. 7, 1933 |
| 1,938,871 | Smith | Dec. 12, 1933 |
| 2,219,595 | Lang | Oct. 29, 1940 |
| 2,252,570 | Knuth | Aug. 12, 1941 |
| 2,423,863 | Wales | July 15, 1947 |
| 2,902,166 | Bahr | Sept. 1, 1959 |